(12) United States Patent
Li et al.

(10) Patent No.: US 10,606,077 B2
(45) Date of Patent: Mar. 31, 2020

(54) DISPLAY SWITCHING DEVICE, SWITCHING METHOD, WEARABLE DISPLAY DEVICE AND DISPLAYING METHOD

(71) Applicant: BOE TECHNOLOGY GROUP CO., LTD., Beijing (CN)

(72) Inventors: Wenbo Li, Beijing (CN); Yanbing Wu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 48 days.

(21) Appl. No.: 15/527,809

(22) PCT Filed: Oct. 18, 2016

(86) PCT No.: PCT/CN2016/102348
§ 371 (c)(1),
(2) Date: May 18, 2017

(87) PCT Pub. No.: WO2017/124785
PCT Pub. Date: Jul. 27, 2017

(65) Prior Publication Data
US 2018/0059419 A1    Mar. 1, 2018

(30) Foreign Application Priority Data

Jan. 20, 2016    (CN) .......................... 2016 1 0039130

(51) Int. Cl.
*G02B 27/01*    (2006.01)
*G09G 3/00*    (2006.01)
(Continued)

(52) U.S. Cl.
CPC ....... *G02B 27/0172* (2013.01); *G02B 27/017* (2013.01); *G06F 3/147* (2013.01);
(Continued)

(58) Field of Classification Search
CPC .. G02B 27/01; G02B 27/0172; G06T 19/006; G06T 7/00; H04N 5/232061; G06K 9/00
See application file for complete search history.

(56) References Cited

U.S. PATENT DOCUMENTS 9,916,635 B2 *   3/2018   Kim .................... H04N 5/265
2003/0063132 A1  4/2003   Sauer et al.
(Continued)

FOREIGN PATENT DOCUMENTS

CN    101571748 A    11/2009
CN    204613516 A    9/2015
(Continued)

OTHER PUBLICATIONS

Search Report for t for International Application No. PCT/CN2016/102348 dated Jan. 22, 2017.
(Continued)

*Primary Examiner* — Samantha (Yuehan) Wang
(74) *Attorney, Agent, or Firm* — Calfee, Halter & Griswold LLP (57) ABSTRACT

A display switching device, switching method, wearable display device and displaying method are disclosed. The display switching device includes a collector configured to operate in an enable mode for enabling a wearable display device to acquire entity information or a disable mode for disabling the wearable display device to acquire entity information, and a first controller configured to determine display switch of the wearable display device based on an operation mode of the collector. The wearable display device displays an AR image based on the entity information when the collector operates in the enable mode, and the wearable display device displays a VR image when the collector operates in the disable mode. The wearable display device includes the display switching device.

19 Claims, 5 Drawing Sheets

(51) Int. Cl.
*G06F 3/147* (2006.01)
*H04N 5/232* (2006.01)
*G06T 19/00* (2011.01)

(52) U.S. Cl.
CPC ............ *G06T 19/006* (2013.01); *G09G 3/003* (2013.01); *H04N 5/232* (2013.01); *G02B 2027/0178* (2013.01)

(56) References Cited

U.S. PATENT DOCUMENTS

| | | | |
|---|---|---|---|
| 2003/0210832 A1 | 11/2003 | Benton | |
| 2013/0002701 A1* | 1/2013 | Ida | H04N 5/64 345/589 |
| 2014/0240492 A1* | 8/2014 | Lee | H04N 5/2256 348/136 |
| 2015/0104069 A1* | 4/2015 | Li | G01C 21/3647 382/103 |
| 2015/0235433 A1 | 8/2015 | Miller et al. | |
| 2016/0253843 A1* | 9/2016 | Lee | G06F 3/04815 345/633 |

FOREIGN PATENT DOCUMENTS

| | | |
|---|---|---|
| CN | 105188516 A | 12/2015 |
| CN | 204855937 A | 12/2015 |
| CN | 105554392 A | 5/2016 |
| CN | 205336410 U | 6/2016 |

OTHER PUBLICATIONS

First Office Action for Chinese Patent Application No. 201610039130.5 dated Jan. 17, 2018.

* cited by examiner

DISPLAY SWITCHING DEVICE, SWITCHING METHOD, WEARABLE DISPLAY DEVICE AND DISPLAYING METHOD

RELATED APPLICATION

The present application is the U.S. national phase entry of PCT/CN2016/102348, with an international filling date of Oct. 18, 2016, which claims the benefit to Chinese Patent Application No. 201610039130.5, filed on Jan. 20, 2016, the entire disclosures of which are incorporated herein by reference.

FIELD

The present disclosure relates to the field of display technologies, and in particular to a display switching device, a switching method therefor, a wearable display device and a displaying method therefor.

BACKGROUND

With the development of display technologies, more and more wearable display devices are being applied in people's lives. These wearable display devices have achieved wide popularity for wearing convenience and good practicability.

Nowadays, common wearable display devices on the market are mainly divided into AR-type wearable display devices and VR-type wearable display devices. An AR-type wearable display device is also called an augmented reality type wearable display device which applies AR techniques to a wearable display device so as to superimpose a VR image on entity information that reflects the real world on a display screen of the AR-type wearable display device, thereby implementing a function of augmenting reality. A VR-type wearable display device is also called a virtual reality type wearable display device which applies VR techniques to a wearable display device so as to form a VR image via a display screen by utilizing a three dimensional dynamic vision environment simulated by a VR information processing unit thereof, i.e., VR information, thereby allowing users to immerse themselves in the three dimensional dynamic vision environment. Moreover, the VR-type wearable display device performs human-machine interaction by means of the VR information processing unit such that the user can experience an immersive feeling.

However, an existing wearable display device only supports AR display or VR display separately. When a user desires to experience different display modes, he/she has to change his/her wearable display device in order to satisfy the need, which degrades the user's use experience.

SUMMARY

The present disclosure provides a display switching device for a wearable display device, comprising a collector configured to be operable in an enable mode for enabling the wearable display device to acquire entity information or in a disable mode for disabling the wearable display device to acquire entity information; and a first controller configured to determine display switch of the wearable display device based on an operation mode of the collector, comprising: wherein the first controller controls_ the wearable display device to display an augmented reality AR image based on the entity information when the collector operates in the enable mode, and wherein the first controller controls_the wearable display device to display a virtual reality VR image when the collector operates in the disable mode.

The present disclosure further provides a wearable display device, comprising a virtual reality VR-type wearable display device body, an augmented reality AR information processing unit, and the display switching device as mentioned above, wherein the collector is configured to be operable in an enable mode for enabling the AR information processing unit to acquire entity information or in a disable mode for disabling the AR information processing unit to acquire entity information; and the first controller is configured to determine display switch of the VR-type wearable display device body based on an operation mode of the collector, wherein the first controller controls_the VR-type wearable display device body to display an AR image based on the entity information from the AR information processing unit when the collector operates in the enable mode, and wherein the first controller controls_the VR-type wearable display device body to display a VR image when the collector operates in the disable mode.

The present disclosure further provides wearable glasses, comprising a VR-type wearable glass body, and the AR information processing unit and the display switching device mentioned in the above technical solution are arranged on a frame of VR-type wearable glass. An output of the first controller in the display switching device is connected with a control terminal of the AR information processing unit and a control terminal of the VR-type wearable glass body respectively. An image data output of the AR information processing unit is connected with an image signal input of an image display unit in the VR-type wearable glass body.

The present disclosure further provides a method for display switching in the display switching device mentioned in the above technical solution. The display switching method comprises running the collector to have it operate in an enable mode for enabling the wearable display device to acquire entity information or in a disable mode for disabling the wearable display device to acquire entity information; determining in which mode the collector operates; and determining display switch of the wearable display device based on an operation mode of the collector, comprising controlling, by the first controller, the wearable display device to display an AR image based on the entity information when the collector operates in the enable mode, and controlling, by the first controller, the wearable display device to display a VR image when the collector operates in the disable mode.

The present disclosure further provides a method for displaying in the wearable display device mentioned in the above technical solution. The method comprises running the collector to have it operate in an enable mode for enabling the wearable display device to acquire entity information or in a disable mode for disabling the wearable display device to acquire entity information; determining in which mode the collector operates; and determining display switch of the wearable display device based on an operation mode of the collector, comprising when the collector operates in the enable mode, acquiring the entity information and generating AR image data based on the entity information by the AR information processing unit, and controlling, by the first controller, the VR-type wearable display device body to display an AR image based on the AR image data from the AR information processing unit, and when the collector operates in the disable mode, controlling, by the first controller, the VR-type wearable display device body to display a VR image.

In the display switching device provided in the present disclosure, the collector is operable in different modes such that the wearable display device is selectively enabled or disabled to acquire entity information. The first controller may know timely in which mode the collector operates, and thus, depending on the mode of the collector, correspondingly control the wearable display device to display an AR image based on the entity information or display a VR image. Therefore, the display switching device according to embodiments of the present disclosure may allow to switch between AR display and VR display freely, which then allows the wearable display device to accommodates both AR display and VR display and thereby enhances the user's use experience.

Furthermore, in the wearable display device provided in embodiments of the present disclosure, when the collector enables the wearable display device to acquire entity information, the first controller may control the AR information processing unit to start to acquire the entity information, and the AR information processing unit may generate AR image data based on the entity information for displaying an AR image by means of the VR-type wearable display device body. When the collector disables the wearable display device to acquire entity information, the first controller may further control the VR-type wearable display device body to start display of a VR image. Therefore, a wearable display device provided in the present disclosure accommodates both AR display and VR display, and is switchable between AR display and VR display according to a user's demand such that the user may view an AR image or a VR image without changing his/her wearable display device, which greatly enhances the user's use experience.

BRIEF DESCRIPTION OF DRAWINGS

The drawings described herein are used to provide further explanations to the present disclosure and constitute a portion of the present disclosure. Schematic embodiments of the present disclosure and description thereof are provided for explaining the proposed solutions and should not be construed as limiting. In the drawings.

DETAILED DESCRIPTION

In order to further describe the display switching device, the switching method therefor, the wearable display device, the displaying method therefor and the wearable glasses provided according to embodiments of the present disclosure, detailed depictions are provided below with reference to the drawings of the description.

It is an object of the present disclosure to provide an improved display switching device, switching method therefor, wearable display device and displaying method therefor.

Figure 1:
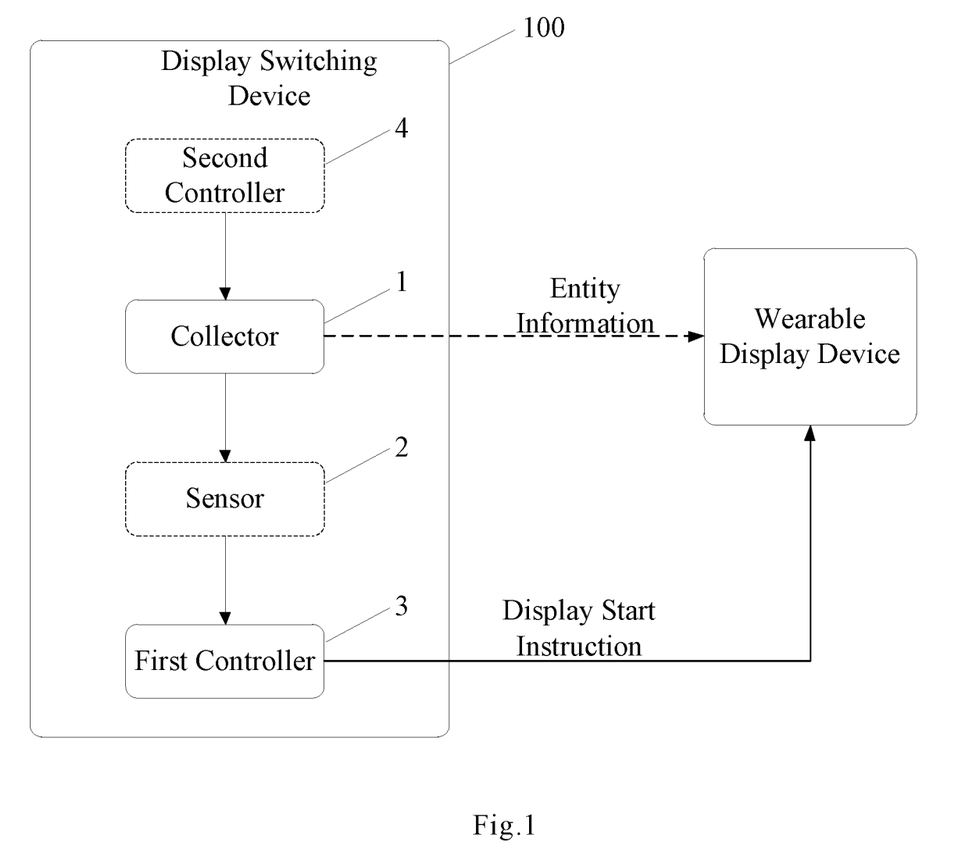
FIG. 1 is a structural block diagram of a display switching device provided according to embodiments of the present disclosure.

FIG. 1 shows a structural block diagram of a display switching device 100 provided according to embodiments of the present disclosure. As shown in FIG. 1, the display switching device 100 comprises: a collector 1 and a first controller 3. The collector 1 is operable in an enable mode for enabling a wearable display device to acquire entity information or in a disable mode for disabling the wearable display device to acquire entity information. The collector 1 and the first controller 3 may be communicatively connected. The first controller 3 may be used for controlling the wearable display device to display an AR image based on the entity information when the collector 1 operates in the enable mode and then the wearable display device may acquire the entity information, and controlling the wearable display device to display a VR image when the collector 1 operates in the disable mode and then the wearable display device cannot acquire the entity information.

In some embodiments, the collector 1 may operate in different modes, i.e., enabling or disabling the wearable display device to acquire the entity information, according to a user's demand, for example, based on the user's choice. Alternatively, the collector 1 may also switch its operation mode adaptively based on changes of the environment.

In some embodiments, the collector 1 may allow the wearable display device to acquire the entity information when the user chooses AR display. The first controller 3 may be aware in which mode the collector 1 operates timely, and control the wearable display device to display an AR image based on the entity information when the collector 1 is determined to operate in the enable mode, and control the wearable display device to display a VR image when the collector 1 is determined to operate in the disable mode. Therefore, in the display switching device provided according to embodiments of the present disclosure, the first controller 3 may control the wearable display device to selectively display an AR image or a VR image based on the operation mode of the collector 1, thereby achieving a switch between AR display and VR display.

In some embodiments, the first controller 3 controls the wearable display device to display an AR image or a VR image in the following way: when the collector 1 operates in a mode for enabling the wearable display device to acquire entity information, sending an AR display start instruction to the wearable display device, and when the collector 1 operates in a mode for disabling the wearable display device to acquire entity information, sending a VR display start instruction to the wearable display device. That is, the first controller 3 may send, based on the operation mode of the collector 1, to the wearable display device, an AR display start instruction or a VR display start instruction so as to control corresponding image display. It would be understood that the function of the first controller 3 may be implemented via software or by using some simple ON-OFF switching circuits.

Referring to FIG. 1, in some embodiments, the display switching device 100 further comprises a second controller 4 for controlling operation mode setting for the collector 1. An output of the second controller 4 is connected with a control terminal of the collector 1. When the user chooses AR display, he/she may set by means of the second controller 4 the collector 1 to operate in a mode for enabling the wearable display device to acquire entity information, and when the user chooses VR display, he/she may set by means of the second controller 4 the collector 1 to operate in a mode for disabling the wearable display device to acquire entity information. In an example, the second controller 4 may in a form of a switch control circuit, and suitable types and specific forms of switch control circuits may be chosen upon actual requirements.

In some embodiments, when the second controller 4 sets the collector 1 to operate in a mode for enabling the wearable display device to acquire entity information, the second controller 4 may further inform the first controller of a set enable mode so as to send to the wearable display device an AR display start instruction for controlling the wearable display device to display an AR image based on the entity information. When the second controller 4 sets the collector 1 to operate in a mode for disabling the wearable display device to acquire entity information, the second controller 4 may also inform the first controller of a set disable mode so as to send to the wearable display device a VR display start instruction for controlling the wearable display device to display an VR image based on the entity information.

It should be noted that although the first controller 3 and the second controller 4 in the above embodiments are illustrated as two separate controllers, alternatively, the first controller 3 and the second controller 4 may also be implemented by a single controller. As long as the control terminal of the wearable display device receives the AR display start instruction or the VR display start instruction sent from the controller, corresponding actions may be performed.

In some embodiments, the display switching device 100 further comprises a sensor 2 for monitoring in which mode the collector 1 operates. The collector 1 and the first controller 3 are coupled with each other via the sensor 2, and the first controller 3 determines an operation mode of the collector 1 by means of the sensor 2.

In some embodiments, the sensor 2 may be implemented by a conventional voltage sensor or charge-coupled device (CCD) sensor. When the sensor 2 is implemented as a voltage sensor, the mode of the collector 1 is determined by detecting a voltage signal of the collector 1. Alternatively, the sensor 2 may also be implemented as a CCD sensor. CCD sensor is a photosensor capable of detecting a light signal when the wearable display device acquires entity information and thereby determining the operation mode of the collector 1. As a result, the CCD sensor may directly monitor the entity information acquired by the wearable display device. Therefore, the CCD sensor may determine whether the entity information has been acquired by the wearable display device more accurately than the voltage sensor.

It would be appreciated that although the sensor in the above embodiments is described as a voltage sensor or a CCD sensor, it may be in other forms as long as it may monitor different operation modes of the collector 1. In an example, the sensor 2 is selected as adapting to a specific type collector 1 so as to better monitor operation modes of the collector 1.

In some embodiments, the collector 1 may be a camera or a reversible color changing device convertible between a transparent state and a blocking state.

When the collector 1 is a camera, an entity information output of the collector 1 is connected with an entity information input of the wearable display device. In operation, the camera may operate in different modes for example by controlling the camera to be switched on or off. In the enable mode, the camera is switched on so as to acquire entity information, and optionally, after entity information is acquired, it may directly send the entity information to the wearable display device for displaying. At this point, the camera operating in the enable mode serves not only as a switch for enabling the wearable display device to acquire entity information, but also as an entity information collection unit for providing the entity information to the wearable display device. In the disable mode, the camera is switched off so as not to acquire entity information.

When the collector 1 is a reversible color changing device, the reversible color changing device enables the wearable display device to acquire entity information in a transparent state, and disables the wearable display device to acquire entity information in a blocking state (e.g., a non-transparent state). The reversible color changing device may be controlled to convert between a transparent state and a blocking state, so that it may operate in different modes. In the enable mode, the reversible color changing device is converted to (i.e., assumes) a transparent state, so the wearable display device may acquire entity information. In the disable mode, the reversible color changing device is converted to (i.e., assumes) a blocking state, so the wearable display device cannot acquire entity information. That is, the wearable display device may acquire entity information through the reversible color changing device when the reversible color changing device is in its transparent state, but cannot acquire entity information through the reversible color changing device when the reversible color changing device is in its blocking state. In some embodiments, the reversible color changing device may in various forms, such as a photochromic device, an electrochromic device, a thermochromic device or a passive display panel; wherein the passive display panel may be a passive LCD (liquid-crystal display) display panel or a passive OLED (organic light-emitting diode).

It would be appreciated that although the collector 1 in the above embodiments is described as a camera or a reversible color changing device, the collector may be also chosen as other suitable types of collectors upon actual requirements.

Figure 2:
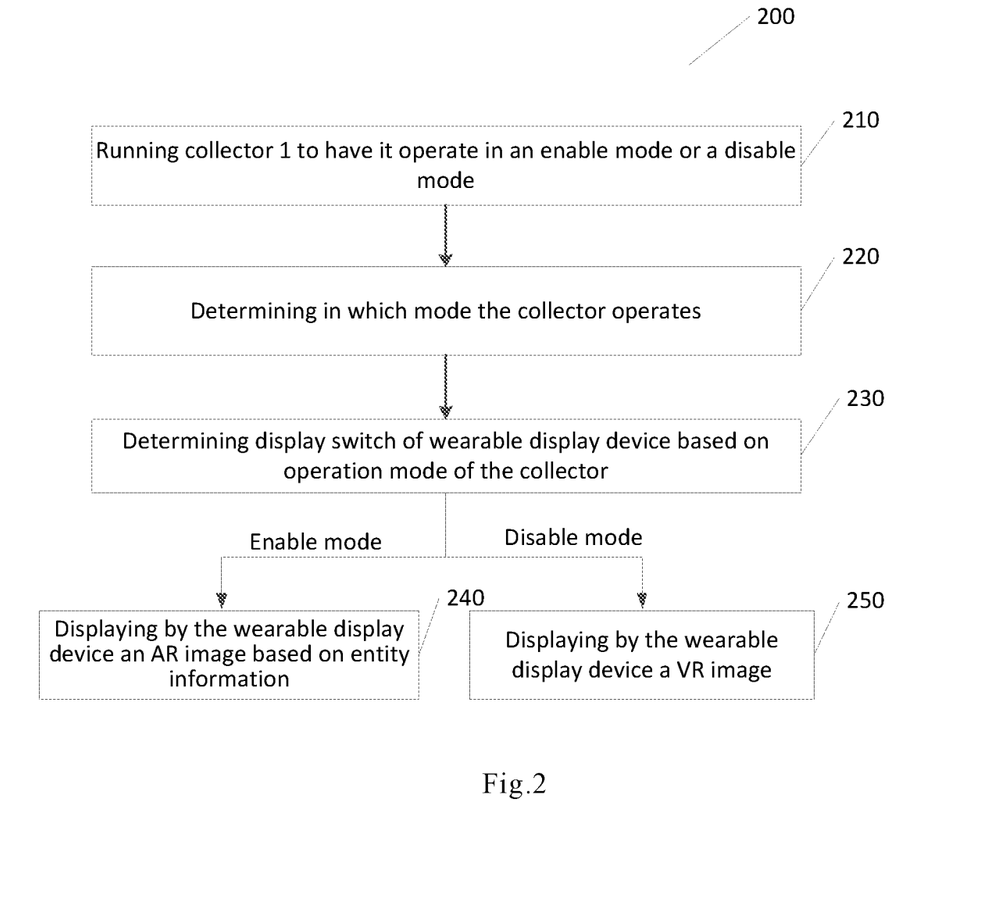
FIG. 2 is a flow diagram of a display switching method provided according to embodiments of the present disclosure.

FIG. 2 shows a flow diagram of a display switching method 200 provided according to embodiments of the present disclosure, for use in a display switching device provided in the above embodiments. As shown in the drawing, the display switching method 200 comprises:

In step 210, running the collector 1 to have it operate in an enable mode for enabling the wearable display device to acquire entity information or in a disable mode for disabling the wearable display device to acquire entity information. In some embodiments, the collector 1 may operate in different modes based on a user's choice, or its operation mode may be adapted to changes of the environment adaptively.

In step 220, determining in which mode the collector operates.

In step 230, determining display switch of the wearable display device based on an operation mode of the collector, comprising:

In step 240, controlling by the first controller 3 the wearable display device to display an AR image based on the entity information when the collector 1 operates in the enable mode, and In step 250, controlling by the first controller 3 the wearable display device to display a VR image when the collector 1 operates in the disable mode.

The display switching method according to embodiments of the present disclosure may allow switching between AR display and VR display as desired such that the wearable display device may accommodate both AR display and VR display, thereby improving the user's use experience.

In some embodiments, a sensor is used for monitoring in which mode the collector operates and thereby determining an operation mode of the collector. The monitored mode or related information of the collector (e.g., the ON/OFF state of the camera or the transparency of the reversible color changing device) may be transmitted to the first controller periodically, or upon receipt of a query request from the first controller. In some embodiments, when the sensor senses a change in the mode of the collector, it transmits the monitored mode to the first controller instantly.

In some embodiments, the display switching method further comprises employing the second controller 4 to control operation mode setting for the collector 1.

In some embodiments, the display switching method further comprises:

When setting the collector 1 to operate in an operation mode for enabling the wearable display device to acquire entity information, the second controller 4 informs the first controller of the set mode so as to send an AR display start instruction to the wearable display device; and When setting the collector 1 to operate in an operation mode for disabling the wearable display device to acquire entity information, the second controller 4 informs the first controller of the set mode so as to send a VR display start instruction to the wearable display device.

In some embodiments, the operation mode setting for the collector 1 may be controlled, e.g., based on the user's choice, by the second controller 4.

In some embodiments, when the collector 1 in the display switching device is a camera, the wearable display device is enabled to acquire entity information by switching on the camera to acquire entity information and sending the entity information acquired by the camera to the wearable display device; and the wearable display device is disabled to acquire entity information by switching off the camera to stop acquisition of entity information.

In some embodiments, when the collector 1 in the display switching device is a reversible color changing device convertible between a transparent state and a blocking state, the wearable display device is enabled to acquire entity information by converting the reversible color changing device to the transparent state; and the wearable display device is disabled to acquire entity information by converting the reversible color changing device to the blocking state.

It should be noted that the display switching method according to the present disclosure is further applicable in other types of display switching devices, but not limited to the display switching devices mentioned above.

Figure 3:
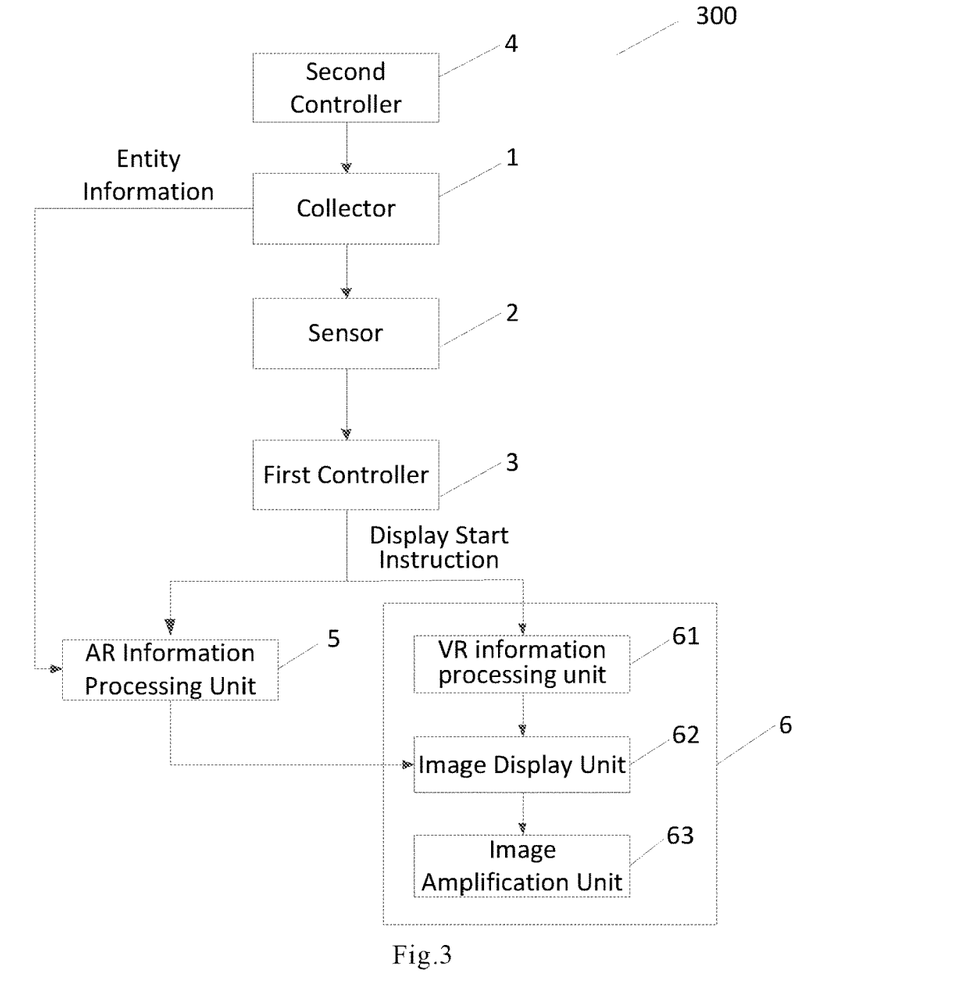
FIG. 3 is a structural block diagram of a wearable display device provided according to embodiments of the present disclosure.

FIG. 3 shows a structural block diagram of a wearable display device 300 provided according to embodiments of the present disclosure. As shown in the drawing, the wearable display device 300 comprises a VR-type wearable display device body 6, an AR information processing unit 5, and a display switching device according to the present disclosure, for example, the display switching device 100 as shown in FIG. 1.

An output of the first controller 3 in the display switching device 100 is connected with a control terminal of the AR information processing unit 5 and a control terminal of the VR-type wearable display device body 6 respectively. An image data output of the AR information processing unit 5 is connected with an image signal input of an image display unit 62 in the VR-type wearable display device body 6.

In operation, when the collector 1 operates in a mode for enabling the wearable display device to acquire entity information, the AR information processing unit acquires entity information, generates AR image data based on the entity information, and displays an AR image via the image display unit. When the collector 1 operates in a mode for disabling the wearable display device to acquire entity information, the VR-type wearable display device body 6 displays a VR image.

As would be known from the specific operation process of the wearable display device described in the above embodiments, the first controller 3 may correspondingly control the AR information processing unit 5 and the VR-type wearable display device body 6 based on the operation mode of the collector, by connecting the output of the first controller 3 with the control terminal of the AR information processing unit 5 and the control terminal of the VR-type wearable display device body 6 respectively. When the collector 1 operates in a mode for enabling the wearable display device to acquire entity information, the first controller 3 controls the AR information processing unit 5 to start to acquire entity information. Since the image data output of the AR information processing unit 5 is connected with the VR-type wearable display device body 6, e.g., the image signal input of the image display unit 62, the AR information processing unit 5 may send AR image data generated based on the entity information to the image display unit 62 for displaying an AR image thereby. When the collector 1 operates in a mode for disabling the wearable display device to acquire entity information, the first controller 3 controls the VR-type wearable display device body 6 to start displaying so as to display a VR image. Therefore, the wearable display device provided in the embodiments accommodates both AR display and VR display, and is switchable between AR display and VR display according to a user's demand, such that the user may view an AR image or a VR image without changing the wearable display device, which greatly enhances the user's use experience.

It should be noted that in order to ensure normal operation of the wearable display device, the wearable display device in the above embodiments further comprises a power supply unit located outside a viewing angle range of a user, for supplying power to components of the wearable display device, including the collector 1, the first controller 3, the AR information processing unit 5, the VR-type wearable display device body 6 and so on. The power supply unit may be a solar powered unit or a battery powered unit. When the power supply unit is a solar powered unit, solar power may be continuously converted into electric power in a direct manner so as to prolong the service life of battery of the wearable display device while providing electric power to the wearable display device.

Continuing to refer to FIG. 3, the display switching device 300 further comprises a sensor 2 and a second controller 4 located outside a viewing angle range of the user. The second controller 4 is used for controlling the operation mode setting for the collector 1. The collector 1 is connected with an input of the first controller 3 via the sensor 2. An output of the second controller 4 is connected with the collector 1. Since the output of the second controller 4 is connected with the collector 1, the user may control the collector 1 by using the second controller 4 such that the collector 1 operates in the enable mode for enabling the wearable display device to acquire entity information or in the disable mode for disabling the wearable display device to acquire entity information. In some embodiments, the collector 1 is operable to enable the AR information processing unit 5 to acquire entity information, or disable the AR information processing unit 5 and/or the VR-type wearable display device body 6 to acquire entity information. In some embodiments, the second controller 4 is further arranged to inform the first controller of a set mode so as to send an AR display start instruction to the AR information processing unit 5 when the collector 1 is set to operate in a mode for enabling the AR information processing unit 5 to acquire entity information, and inform the first controller of a set mode so as to send a VR display start instruction to the VR-type wearable display device body 6 when the collector 1 is set to operate in a mode for disabling the AR information processing unit 5 to acquire entity information.

The VR-type wearable display device body 6 may comprise a VR information processing unit 61 and an image display unit 62. A control terminal of the VR information processing unit 61 is connected with an output of the first controller 3 such that the first controller 3 may control the VR information processing unit 61 to start immediately when the collector 1 operates in a mode for disabling the wearable display device to acquire entity information. The image data output of the VR information processing unit 61 is connected with the image signal input of the image display unit 62 such that the VR information processing unit 61 may transmit VR image data to the image display unit 62 after being started, thereby displaying to the user a VR image simulating a three dimensional virtual environment.

The image display unit 62 may be implemented by using any display panel that is applicable, for example, an OLED display panel, a LCD display panel and the like.

The collector 1 may be implemented in a variety of manners. As an example, the collector 1 may be implemented as a camera or a reversible color changing device convertible between a transparent state and a blocking state.

When the collector 1 is a camera, an entity information output of the collector 1, i.e., the camera, is connected with an entity information input of the AR information processing unit 5. In this way, entity information may be acquired not only by using an entity information collecting unit in the AR information processing unit 5, but also indirectly by using the collector 1. The entity information acquired by the collector 1 is sent to the AR information processing unit 5. In an example, a sensor may monitor the operation mode of the collector, for example, by monitoring whether the collector 1 sends entity information to the AR information processing unit 5.

When the collector 1 is a reversible color changing device, the reversible color changing device may be converted between a transparent state and a blocking state to enable or disable the wearable display device to acquire entity information. In an example, the sensor may monitor the operation mode of the collector by monitoring the state assumed by the collector. When the collector 1 is a reversible color changing device, it may be disposed within a viewing angle range of the user.

Furthermore, referring back to FIG. 3, the VR-type wearable display device body in the above embodiment may further comprise an image amplification unit 63 for amplifying an AR image or a VR image to be presented to the user. In some embodiments, an image amplification unit 63 located within the viewing angle range of the user may be selectively added upon actual requirements. Since the image amplification unit 63 may amplify both the entity information and the image displayed by the image display unit, the user may view them more clearly, which promotes the user's visual experience.

In some embodiments, the image amplification unit 63 is a pair of convex lenses. The pair of convex lenses are opposite to the user's eyes and an angle between optical axes of the two convex lenses is 3°-5°. In this way, an upright virtual image of the image presented after being amplified by the convex lenses may be better viewed by the user.

In some embodiments, the image amplification unit 63 is disposed within the viewing angle range of the user, while the AR information processing unit 5, the VR information processing unit 61 and the image display unit 62 are all disposed outside the viewing angle range of the user.

Operation principles of a wearable display device are illustrated below with reference to FIG. 4 and FIG. 5 respectively, in which the collector is a reversible color changing device, and is in a transparent state or a blocking state.

Figure 4:
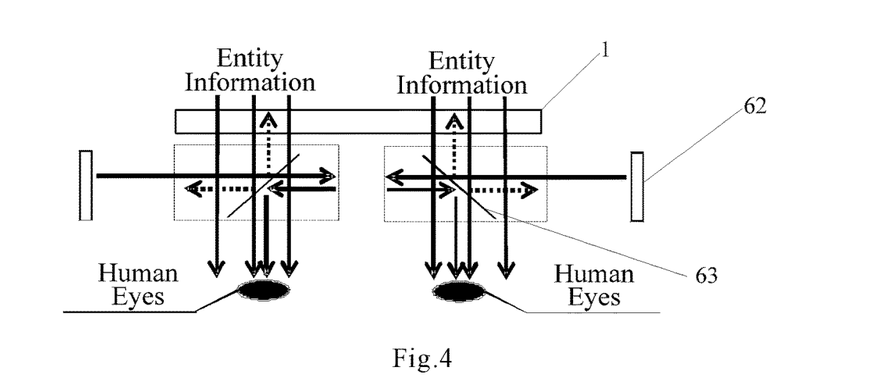
FIG. 4 illustrates operation principle of a wearable display device when a reversible color changing device is in a transparent state according to embodiments of the present disclosure.

Referring to FIG. 4, when the reversible color changing device is in a transparent state, entity information may be acquired through the reversible color changing device. In a case as shown in FIG. 4, since the collector is transparent, the entity information may be viewable by the user's eyes. The first controller 3 may control the AR information processing unit 5 to acquire entity information for example when the reversible color changing device is found to be in a transparent state by the sensor 2. The AR information processing unit 5 generates AR image data based on the entity information for displaying an AR image to the user via the image display unit 62.

Figure 5:
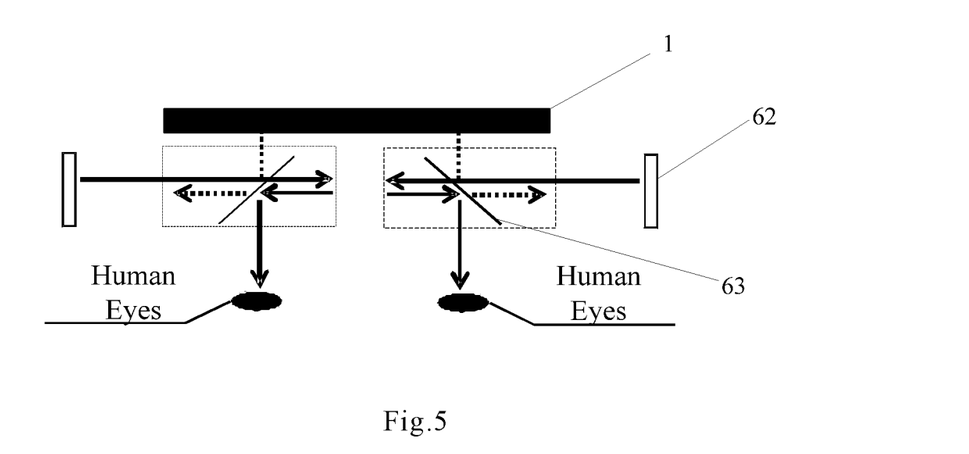
FIG. 5 illustrates operation principle of a wearable display device when a reversible color changing device is in a blocking state according to embodiments of the present disclosure.

Referring to FIG. 5, when the reversible color changing device is in a blocking state, since the reversible color changing device is not transparent, the entity information cannot be acquired through the reversible color changing device. At this point, the first controller 3 may control the VR information processing unit 61 to acquire VR information for example when the reversible color changing device is found to be in a blocking state by the sensor 2. The VR information processing unit 61 generates VR image data for displaying a VR image to the user via the image display unit 62.

In the above embodiment, the reversible color changing device may allow passage of the user's line of sight in a transparent state such that the entity information may be viewed directly, and block the user's line of sight in a blocking state such that acquisition of entity information by the wearable display device is blocked. Therefore, in this embodiment, the collector 1, i.e., the reversible color changing device, is disposed within the viewing angle range of the user. The AR information processing unit 5, the VR information processing unit 61 and the image display unit 62 are all disposed outside the viewing angle range of the user, thereby avoiding influences on viewing of AR display or VR display by the user.

It should be noted that when the collector 1 is a reversible color changing device and the reversible color changing device is in a transparent state, there is no components blocking the user's line of sight, in order to allow the user to see the entity information. Therefore, it is required to dispose the power supply unit, the second controller 4, the sensor 2 and so on mentioned in the above embodiments outside the viewing angle range of the user.

The wearable display device according to the present disclosure comprises the display switching device provided based on the above embodiments. Although in the embodiments of the wearable display device provided above only some exemplary structures of the display switching device are described, it should be understood that the wearable display device according to the present disclosure may further comprise any applicable structures of display switching device.

Besides, the wearable display device 300 may take various forms, such as wearable glasses, a wearable helmet and so on.

Figure 6:
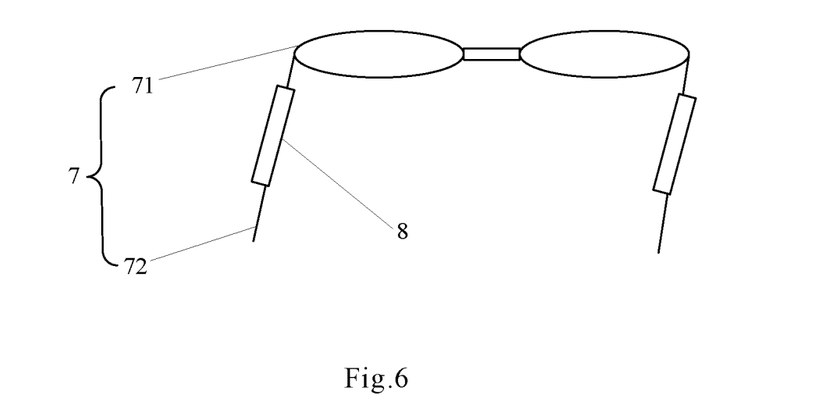
FIG. 6 is a schematic structure diagram of wearable glasses provided according to embodiments of the present disclosure.

When the wearable display device 300 is in the form of wearable glasses, the VR-type wearable display device body 6 may further comprise a frame 7, which comprises rims 71 and legs 72 connected with the rims 71.

When the collector 1 is a camera, the collector 1, the first controller 3, the second controller 4 and the AR information processing unit 5 may be disposed in any positions of the frame 7 of the VR-type wearable display device body.

When the collector 1 is a reversible color changing device convertible between a transparent state and a blocking state, in order to avoid blocking the user's view of the entity information, the AR information processing unit 5, the VR information processing unit 61, the image display unit 62, the first controller 3 and the second controller are all arranged on the legs 72. These components are generally indicated by an electronic integrated unit 8 in FIG. 6. The collector 1 may be arranged in the rims 71 as lenses. The image amplification unit 63 is located within the viewing angle range of the user and arranged in a region between the collector 1 and the user's eyes, so as to ensure that entity information may be amplified by the image amplification unit 63 after passing through the reversible color changing device in a transparent state and thus better viewed by the user. The image amplification unit 63 may be connected with the legs 72 or the rims 71 in proper manners.

Figure 7:
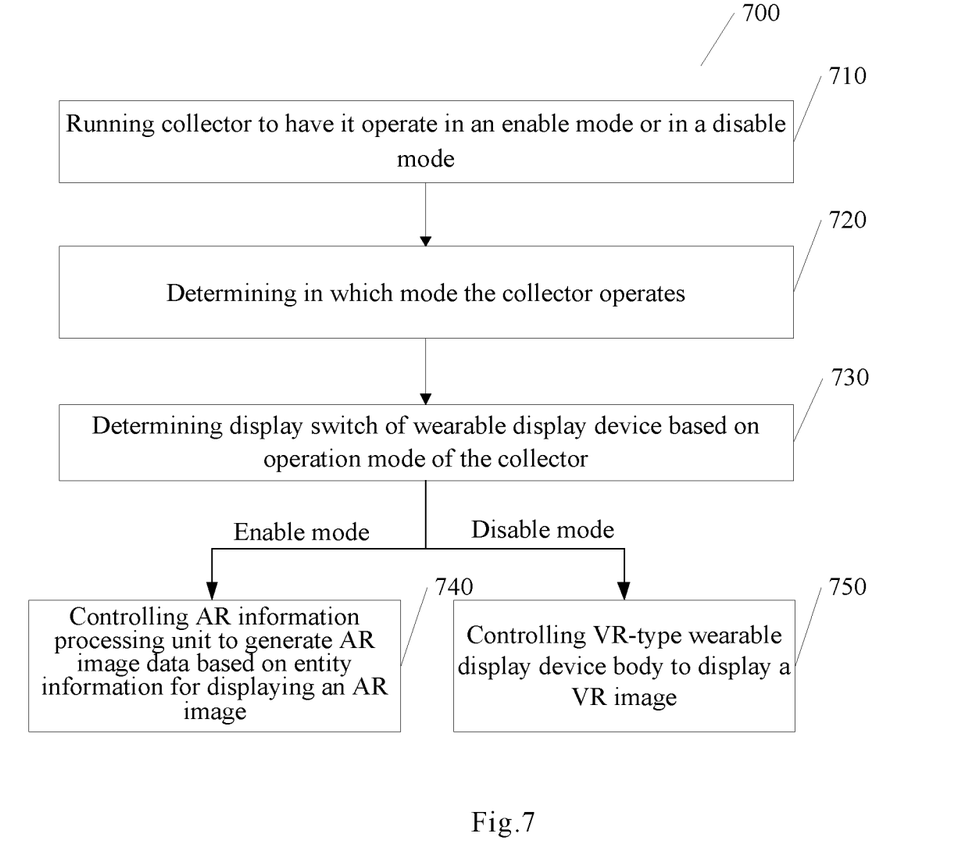
FIG. 7 is a flow diagram of a displaying method for use with a wearable display device provided according to embodiments of the present disclosure.

FIG. 7 shows a displaying method 700 provided according to embodiments of the present disclosure, which is applicable to the wearable display device according to the present disclosure. The method 700 comprises:

In step 710, running the collector 1 to have it operate in an enable mode for enabling the wearable display device to acquire entity information or in a disable mode for disabling the wearable display device to acquire entity information. In some embodiments, the collector 1 may operate in different modes based on the user's choice, or its operation mode may be adapted to changes of the environment adaptively.

In step 720, determining in which mode the collector operates. In some embodiments, this may be implemented by monitoring through a sensor in the wearable display device in which mode the collector operates. The determining may be implemented periodically, or triggered upon a switch of operation mode of the collector.

In step 730, determining display switch of the wearable display device based on the operation mode of the collector, comprising:

In step 740, when the collector 1 is determined to operate in the enable mode for enabling the wearable display device to acquire entity information, controlling by the first controller 3 the AR information processing unit of the wearable display device to generate AR image data based on the entity information for displaying an AR image via the image display unit;

In step 750, when the collector 1 is determined to operate in the disable mode for disabling the wearable display device to acquire entity information, controlling by the first controller 3 the VR-type wearable display device body 6 of the wearable display device to display a VR image. In some embodiments, a VR image is displayed via the image display unit 62 by controlling the VR information processing unit 61 of the VR-type wearable display device body 6 to generate VR image data.

In some embodiments, when the collector 1 in the wearable display device is a camera, the wearable display device is enabled to acquire entity information by switching on the camera to enable it to acquire entity information and send the acquired entity information to the AR information processing unit.

In some embodiments, when the collector 1 in the wearable display device is a reversible color changing device convertible between a transparent state and a blocking state, acquisition of the entity information through the reversible color changing device by the AR information processing unit 5 is allowed by converting the reversible color changing device to a transparent state; and acquisition of the entity information by the AR information processing unit 5 and/or the VR information processing unit 61 is prevented by converting the reversible color changing device to a blocking state.

In some embodiments, when the reversible color changing device is in a transparent state, the AR image and the entity information are presented to the user after being amplified by the image amplification unit, and when it is in a blocking state, the VR image is presented to the user after being amplified by the image amplification unit.

In some embodiments, the method 700 further comprises using the sensor 2 to monitor in which mode the collector 1 operates, so as to determine an operation mode of the collector. In some embodiments, the method 700 further comprises using the second controller 4 to control the operation mode setting for the collector 1 such that the collector 1 operates in a desired mode.

In some embodiments, display switch of a wearable display device is controlled based on the control of the second controller 4. When the second controller 4 sets the collector 1 to operate in an operation mode for enabling the wearable display device to acquire entity information, the second controller 4 informs the first controller of the set mode so as to send an AR display start instruction to the AR information processing unit 5, and when the second controller 4 sets the collector 1 to operate in an operation mode for disabling the wearable display device to acquire entity information, the second controller 4 informs the first controller of the set mode so as to send a VR display start instruction to the VR-type wearable display device body 6.

The wearable displaying method provided according to embodiments of the present disclosure enables a free switch between AR display and VR display such that the wearable display device may accommodate both AR display and VR display, thereby improving the user's use experience.

In depictions of the above implementations, specific features, structures, materials or characteristics may be combined in a suitable way in any one or more embodiments or examples.

What is described above is only specific implementations of the present disclosure, but the protection scope of the present disclosure shall not be limited thereto. The skilled person in the art would easily conceive variations or substitutions within the technical scope disclosed by the present disclosure, which shall fall within the protection scope of the present disclosure. Therefore, the protection scope of the present invention shall be subjected to the protection scope of the claims.

REFERENCE SIGNS

| 1-collector; | 2-sensor; |
| --- | --- |
| 3-first controller; | 4-second controller; |
| 5-AR information processing unit; | 6-VR-type wearable display device body; |
| 61-VR information processing unit; | 62-image display unit; |
| 63-image amplification unit; | 7-frame; |

-continued 71-rim; 72-leg;
8-electronic integrated unit.

The invention claimed is:
1. A display switching device for a wearable display device comprising:
a collector configured to be operable in an enable mode for enabling the wearable display device to acquire entity information or in a disable mode for disabling the wearable display device to acquire entity information;
a sensor connected to the collector and configured to monitor in which mode of the enable mode and the disable mode the collector operates by monitoring whether the collector sends entity information or monitoring a state assumed by the collector; and
a first controller connected to the sensor and configured to determine whether to perform a switch between augmented reality AR display and virtual reality VR display of the wearable display device based on an operation mode of the collector, wherein the first controller is configured to control the wearable display device to switch to the AR display for displaying an augmented reality image in response to a monitored mode being the enable mode when the wearable display device operates in the VR display, and to switch to the VR display for displaying a virtual reality image in response to the monitored mode being the disable mode when the wearable display device operates in the AR display;
wherein the collector comprises a reversible color changing device convertible between a transparent state and a blocking state, the transparent state allowing passage of the user's line of sight such that the entity information may be viewed directly, and the blocking state blocking the user's line of sight such that acquisition of entity information by the wearable display device is blocked, and the reversible color changing device is disposed within the viewing angle range of a user of the wearable display device.

2. The display switching device according to claim 1, wherein the collector further comprises a camera; and
the camera is configured to switch on in the enable mode so as to acquire entity information and send the acquired entity information to the wearable display device, and switch off in the disable mode so as to stop acquisition and sending of the entity information.

3. The display switching device according to claim 1, wherein
the reversible color changing device is configured to convert to the transparent state in the enable mode so as to allow the wearable display device to acquire entity information through the reversible color changing device, and convert to the blocking state in the disable mode so as to prevent the wearable display device from acquiring entity information through the reversible color changing device.

4. The display switching device according to claim 1, further comprising a second controller configured to control operation mode setting for the collector; and the second controller informs the first controller of a set enable mode so as to send to the wearable display device an augmented reality display start instruction for switching the wearable display device to the AR display when the collector is set to operate in the enable mode, and informs the first controller of a set disable mode so as to send to the wearable display device a virtual reality display start instruction for switching the wearable display device to the VR display when the collector is set to operate in the disable mode.

5. A wearable display device, comprising:
a virtual reality-type wearable display device body comprising a virtual reality information processing unit and an image display unit,
an augmented reality information processing unit, and
a display switching device according to claim 1;
wherein the collector is configured to be operable in an enable mode for enabling the augmented reality information processing unit to acquire entity information or in a disable mode for disabling the augmented reality information processing unit to acquire entity information; and
the first controller is configured to determine display switch of the virtual reality-type wearable display device body based on the operation mode of the collector, comprising: controlling the virtual reality-type wearable display device body to display the augmented reality image based on the entity information from the augmented reality information processing unit when the collector operates in the enable mode, and controlling the virtual reality information processing unit to start so as to transmit virtual reality image data to the image display unit to display the virtual reality image when the collector operates in the disable mode;
wherein the augmented reality information processing unit, the virtual reality information processing unit and the image display unit are all disposed outside the viewing angle range of the user.

6. The wearable display device according to claim 5, wherein the collector further comprises a camera; and
the camera is configured to switch on in the enable mode so as to acquire entity information and send the acquired entity information to the augmented reality information processing unit, and switch off in the disable mode so as to stop acquisition and sending of the entity information.

7. The wearable display device according to claim 5, wherein
the controller is configured to control the virtual reality information processing unit to generate virtual reality image data for displaying a virtual reality image on the image display unit when the collector operates in the disable mode; and
the collector is a reversible color changing device convertible between a transparent state and a blocking state; and the reversible color changing device is configured to convert to the transparent state in the enable mode so as to allow the wearable display device to acquire entity information through the reversible color changing device, and convert to the blocking state in the disable mode so as to prevent the wearable display device from acquiring the entity information through the reversible color changing device.

8. The wearable display device according to claim 7, wherein the wearable display device is wearable glasses, and the virtual reality-type wearable display device body in the wearable display device further comprises a frame, the frame comprising rims and legs connected with the rims; the augmented reality information processing unit, the virtual reality information processing unit, the image display unit and the first controller are arranged on the legs, and the collector is arranged in the rims as lenses.

9. The wearable display device according to claim 8, wherein the virtual reality-type wearable display device body further comprises an image amplification unit capable of amplifying the entity information and an image displayed by the image display unit, the image amplification unit being located within the viewing angle range of the user and arranged in a region between the collector and the user's eyes.

10. The wearable display device according to claim 5 further comprising a second controller for controlling operation mode setting for the collector; and
the second controller is further configured to inform the first controller of a set enable mode so as to send to the augmented reality information processing unit an augmented reality display start instruction for switching the wearable display device to the AR display when the collector is set to operate in the enable mode, and inform the first controller of a set disable mode so as to send to the virtual reality-type wearable display device body a virtual reality display start instruction for switching the wearable display device to the VR display when the collector is set to operate in the disable mode.

11. A method for displaying in a wearable display device according to claim 5, the method comprising steps of:
running the collector to have it operate in an enable mode for enabling the wearable display device to acquire entity information or in a disable mode for disabling the wearable display device to acquire entity information;
using the sensor to monitor in which mode of the enable mode and the disable mode the collector operates by monitoring whether the collector sends entity information or monitoring a state assumed by the collector and transmitting the monitored mode to the first controller;
using the first controller to determine an operation mode of the collector based on the monitored mode; and
determining display switch of the wearable display device based on the monitored operation mode of the collector, comprising:
acquiring the entity information and generating augmented reality image data based on the entity information by the augmented reality information processing unit and controlling, by the first controller, the virtual reality-type wearable display device body to display the augmented reality image based on the augmented reality image data from the augmented reality information processing unit, when the collector operates in the enable mode, and
controlling, by the first controller, the virtual reality-type wearable display device body to display the virtual reality image when the collector operates in the disable mode.

12. The method according to claim 11, wherein the collector is a camera; the method further comprising:
switching on the camera in the enable mode so as to acquire entity information and send the entity information to the augmented reality information processing unit, and
switching off the camera in the disable mode so as to stop acquisition and sending of the entity information.

13. The method according to claim 11, wherein the collector is a reversible color changing device convertible between a transparent state and a blocking state; and the method further comprising:
converting the reversible color changing device to the transparent state in the enable mode so as to allow the augmented reality information processing unit to acquire entity information through the reversible color changing device; and converting the reversible color changing device to the blocking state in the disable mode so as to prevent the augmented reality information processing unit from acquiring the entity information through the reversible color changing device; and
the step of controlling the virtual reality-type wearable display device body to display a virtual reality image comprises: controlling a virtual reality information processing unit of the virtual reality-type wearable display device body to generate virtual reality image data for displaying a virtual reality image on the image display unit of the virtual reality-type wearable display device body.

14. The method according to claim 13, wherein the step of displaying the augmented reality image further comprises: amplifying, by an image amplification unit of the virtual reality-type wearable display device body, the augmented reality image and the entity information displayed to a user on the image display unit; and
the step of displaying the virtual reality image further comprises: amplifying, by the image amplification unit, the virtual reality image displayed to the user on the image display unit.

15. The method according to claim 11, wherein the method further comprises:
controlling, by a second controller, operation mode setting for the collector based on a user's choice; and
informing the first controller of a set enable mode so as to send, by the first controller, to the augmented reality information processing unit an augmented reality display start instruction when the second controller sets the collector to operate in an enable mode; and informing the first controller of a set disable mode so as to send, by the first controller, to the virtual reality-type wearable display device body a virtual reality display start instruction when the second controller sets the collector to operate in a disable mode.

16. A method for display switching in a display switching device according to claim 1, comprising:
running the collector to have it operate in an enable mode for enabling the wearable display device to acquire entity information or in a disable mode for disabling the wearable display device to acquire entity information;
using the sensor to monitor in which mode of the enable mode and the disable mode the collector operates by monitoring whether the collector sends entity information or monitoring a state assumed by the collector and transmitting the monitored mode to the first controller;
using the first controller to determine whether to perform a switch between augmented reality AR display and virtual reality VR display
of the wearable display device based on the operation mode of the collector monitored by the sensor by:
controlling the wearable display device to switch to the AR display for displaying an augmented reality image in response to a monitored mode being the enable mode when the wearable display device operates in the VR display, and to switch to the VR display for displaying a virtual reality image in response to the monitored mode being the disable mode when the wearable display device operates in the AR display.

17. The method according to claim 16, further comprising:
controlling, by a second controller, operation mode setting for the collector based on a user's choice; and informing the first controller of a set enable mode so as to send, by the first controller, to the wearable display device an augmented reality display start instruction for switching the wearable display device to the AR display when the second controller sets the collector to operate in the enable mode; and informing the first controller of a set disable mode so as to send, by the first controller, to the wearable display device a virtual reality display start instruction for switching the wearable display device to the VR display when the second controller sets the collector to operate in the disable mode.

18. The method according to claim 16, wherein the collector is a camera; the method further comprising:
   switching on the camera in the enable mode so as to acquire entity information and send the entity information to the wearable display device, and
   switching off the camera in the disable mode so as to stop acquisition and sending of the entity information.

19. The method according to claim 16, wherein the collector is a reversible color changing device convertible between a transparent state and a blocking state; the method further comprising:
   converting the reversible color changing device to the transparent state in the enable mode so as to allow the wearable display device to acquire entity information through the reversible color changing device; and converting the reversible color changing device to the blocking state in the disable mode so as to prevent the wearable display device from acquiring the entity information through the reversible color changing device.

* * * * *